United States Patent
Kozak et al.

(10) Patent No.: US 6,558,079 B1
(45) Date of Patent: May 6, 2003

(54) METHOD AND APPARATUS FOR COVERING LANDFILL

(75) Inventors: Randall Jeff Kozak, Surrey (CA); Ian Johnson, Barnsley (GB)

(73) Assignee: EPI Environmental Technologies Inc., Conroe, TX (US)

( * ) Notice: Subject to any disclaimer, the term of this patent is extended or adjusted under 35 U.S.C. 154(b) by 0 days.

(21) Appl. No.: 09/543,061

(22) Filed: Apr. 5, 2000

Related U.S. Application Data (63) Continuation-in-part of application No. 09/510,956, filed on Feb. 22, 2000.

(51) Int. Cl.$^7$ ................... B09B 1/00; B09B 5/00
(52) U.S. Cl. ................ 405/129.15; 405/129.2; 405/129.75; 405/129.9; 405/129.95
(58) Field of Search .............. 405/129.1, 129.15, 405/129.2, 129.35, 129.45, 129.75, 129.9, 129.95, 270, 271, 264, 176, 179, 129.25; 111/199, 200, 900; 172/328; 156/71, 544

(56) References Cited

U.S. PATENT DOCUMENTS

| | | | |
|---|---|---|---|
| 3,204,589 A | 9/1965 | Blackhurst et al. | ........... 111/91 |
| 3,309,875 A | 3/1967 | Niederwemmer | ........... 61/13 |
| 3,583,164 A | 6/1971 | Sherrill | ........... 61/35 |

(List continued on next page.)

FOREIGN PATENT DOCUMENTS

| | | |
|---|---|---|
| CN | 596748 | 3/1978 |
| DE | 4106687 A1 | 10/1991 |
| DE | 29606272 U1 | 7/1996 |
| EP | 0216412 | 4/1987 |
| EP | 579322 A1 | 1/1994 |
| GB | 2179386 | 3/1987 |
| GB | 2179386 A | 3/1987 |
| GB | 2288598 | 10/1995 |
| GB | 2166632 A | * 5/1996 ............... 405/50 |
| JP | 4131171 | 5/1992 |
| JP | 06115601 A | * 4/1994 |
| SU | 718530 | 3/1976 |
| SU | 718530 A | 2/1980 |
| WO | 9203915 | 3/1992 |
| WO | WO-9726416 | * 7/1997 |
| WO | WO 97/27008 | 7/1997 |
| WO | 9839113 | 9/1998 |

OTHER PUBLICATIONS

Geo Hess (UK) Limited; Geo Hess The Natural Solution; *Geo Hess Landfill Cover Materials*; (undated)(4 p.).
PCT International Search Report for Ser. No. PCT/US01/21875—7 pages.
Provisional Patent application in Australia in the name of EPI Environmental Products Inc.; entitled *Apparatus For Laying Plastic Film on a Landfill*; dated Sep. 26, 1997; specification (8 pg.); drawings (15 sheets)

Primary Examiner—Jong-Suk (James) Lee
(74) Attorney, Agent, or Firm—Conley Rose, P.C.

(57) ABSTRACT

A method and apparatus is used for covering the exposed workface of a landfill with a film. The apparatus includes a compactor rotatably mounted on a frame which is hitched to a tractor. A film, spray and ballast deployer is mounted on the end of the frame for spraying the landfill, deploying the film onto the landfill, and deploying the ballast onto the film. The compactor includes a roller which compacts the waste prior to spraying the landfill and deploying the film and serves as a wheel for the frame. Hydraulics are provided to raise and lower the deployer. In operation, the assembly is pulled by the tractor causing the compactor to compact the waste just prior to the deployer laying the film on the workface and the ballast being deposited onto the film. Additionally, the apparatus is capable of casing the overlapping layers of laid film to adhere to the ballast in between thereby forming a seal between the adjoining layers.

55 Claims, 7 Drawing Sheets

U.S. PATENT DOCUMENTS

| | | | |
|---|---|---|---|
| 3,590,588 A | 7/1971 | Draper | 61/11 |
| 3,597,927 A | 8/1971 | Hemphill | 61/35 |
| 3,676,401 A * | 7/1972 | Henry | 524/176 |
| 3,776,528 A * | 12/1973 | Toto | 241/101.742 X |
| 3,782,068 A | 1/1974 | Woyden et al. | 53/64 |
| 3,833,401 A | 9/1974 | Ingram | 117/38 |
| 3,881,707 A * | 5/1975 | Toto | 241/101.742 |
| 3,905,313 A | 9/1975 | Grether | 111/1 |
| 3,980,029 A | 9/1976 | Huggett | 111/1 |
| 3,992,986 A | 11/1976 | Sutton | 100/7 |
| 4,050,972 A | 9/1977 | Cardinal, Jr. | 156/71 |
| 4,092,936 A | 6/1978 | Griffin et al. | 111/1 |
| 4,154,549 A | 5/1979 | Zaslavsky et al. | 405/38 |
| 4,175,496 A | 11/1979 | Rehbein | 111/1 |
| 4,261,520 A | 4/1981 | Hetrick | 239/657 |
| 4,285,161 A | 8/1981 | Kawasaki et al. | 47/9 |
| 4,298,522 A * | 11/1981 | Tamura et al. | 260/45.9 |
| 4,303,507 A | 12/1981 | Smith | 209/252 |
| 4,513,530 A | 4/1985 | Nyboer | 47/9 |
| 4,519,338 A * | 5/1985 | Kramer et al. | 405/129.15 X |
| 4,521,980 A | 6/1985 | Solaja | 37/117.5 |
| 4,604,441 A * | 8/1986 | Ueed et al. | 526/351 |
| 4,616,957 A | 10/1986 | Burrows et al. | 405/179 |
| 4,636,112 A | 1/1987 | Raviv | 405/176 |
| 4,643,111 A * | 2/1987 | Jones | 405/129.2 X |
| 4,705,427 A | 11/1987 | Atkins et al. | 405/36 |
| 4,720,212 A | 1/1988 | Steenbergen et al. | 405/176 |
| 4,724,781 A * | 2/1988 | Higashimura et al. | 111/200 |
| 4,771,570 A | 9/1988 | Nyboer | 47/9 |
| 4,786,208 A | 11/1988 | Raviv | 405/176 |
| 4,796,711 A | 1/1989 | Chrysler | 171/1 |
| 4,838,734 A | 6/1989 | Pinto | |
| 4,884,724 A | 12/1989 | Schmidt | 222/623 |
| 4,888,913 A | 12/1989 | Hoeft | 47/9 |
| 4,909,667 A | 3/1990 | DeMello | 405/128 |
| 4,927,317 A | 5/1990 | Acosta | 414/724 |
| 4,950,106 A | 8/1990 | Richter | 405/128 |
| 4,953,482 A | 9/1990 | Emily | 111/144 |
| 5,009,175 A | 4/1991 | Pember et al. | 111/173 |
| 5,067,272 A | 11/1991 | Constantz | 47/27 |
| 5,070,641 A | 12/1991 | Brockington | 47/9 |
| 5,082,397 A | 1/1992 | Raviv | 405/176 |
| 5,096,158 A | 3/1992 | Burdick et al. | 251/144 |
| 5,108,038 A | 4/1992 | Palladino et al. | 239/661 |
| 5,111,933 A | 5/1992 | Di Biasi et al. | 206/223 |
| 5,114,275 A * | 5/1992 | West et al. | 405/129.6 |
| 5,114,568 A * | 5/1992 | Brinsnead et al. | 209/170 |
| 5,129,735 A | 7/1992 | Neal et al. | 383/109 |
| 5,201,609 A | 4/1993 | Johnson | 405/129 |
| 5,226,376 A | 7/1993 | Shaw | 111/144 |
| 5,226,545 A * | 7/1993 | Foust | 209/3 |
| 5,259,698 A | 11/1993 | Garzon | 405/129 |
| 5,261,171 A | 11/1993 | Bishop | 37/142.5 |
| 5,304,014 A | 4/1994 | Slutz | 405/129 |
| 5,401,118 A * | 3/1995 | Kermer | 405/129.9 |
| 5,416,133 A | 5/1995 | Garcia et al. | 523/124 |
| 5,489,569 A * | 2/1996 | Bryant et al. | 504/166 |
| 5,536,116 A | 7/1996 | Lammers et al. | 405/129 |
| 5,553,446 A | 9/1996 | Sibley et al. | 56/341 |
| 5,562,365 A * | 10/1996 | Berrange | 405/271 |
| 5,565,503 A | 10/1996 | Garcia et al. | 523/124 |
| 5,582,572 A | 12/1996 | Bianchi | 588/252 |
| 5,609,417 A * | 3/1997 | Otte | 366/137 |
| 5,620,281 A | 4/1997 | Lammers et al. | 405/129 |
| 5,679,421 A | 10/1997 | Brinton, Jr. | 428/34.3 |
| 5,694,742 A | 12/1997 | Elliott et al. | 53/436 |
| 5,709,071 A | 1/1998 | Cosimati | 56/327.1 |
| 5,760,118 A | 6/1998 | Sinclair et al. | 524/306 |
| 5,833,401 A * | 11/1998 | Olson | 405/129.75 |
| 5,863,153 A | 1/1999 | Bachell et al. | 405/129 |
| 5,967,242 A * | 10/1999 | Caron et al. | 172/817 |
| 6,050,066 A | 4/2000 | Brodecht | 53/576 |
| 6,071,043 A * | 6/2000 | Hunt | 405/129.65 |
| 6,083,621 A * | 7/2000 | Sugimoto | 428/378 |
| 6,123,480 A | 9/2000 | Petty et al. | 403/164 |
| 6,197,398 B1 * | 3/2001 | Mathieson | 405/270 X |

\* cited by examiner

METHOD AND APPARATUS FOR COVERING LANDFILL

CROSS REFERENCE TO RELATED APPLICATIONS

The present application is a continuation-in-part of U.S. patent application Ser. No. 09/510,956 entitled "Method and Apparatus for Covering Landfill"filed on Feb. 22, 2000.

BACKGROUND OF THE INVENTION

1. Field of the Invention

The present invention is directed to a method and apparatus for laying a film on a landfill, and more particularly to a method and apparatus for compacting the landfill, spraying a pesticide upon the compacted waste, laying film over the landfill, and depositing ballast on the film.

2. Description of the Related Art

Landfills have become highly regulated in recent years with an emphasis on minimizing their impact to surrounding populations and the environment. Regulatory agencies, like the Environmental Protection Agency of the United States, mandate requirements for landfill design and maintenance in an attempt to minimize the potential for odors, ground water contamination, fires, blowing litter, disease vectors, and vermin infestation. In an attempt to prevent such undesirable occurrences, regulatory agencies have adopted strict restriction and codes as to the construction and covering of landfills.

Often, new landfills are created with a liner constructed of a polymeric film to cover the bottom of the landfill to prevent ground water contamination and disease vectors. The liner is used to prevent seepage from the waste stored on top of the liner from entering into the community water table located underground. Most often, the liner is installed by overlapping sections of film laid along the bottom of the recently excavated landfill and heat sealing the sections together to ensure that no liquid seeps through the liner between the panels of film and into the virgin ground underneath the landfill. It is preferred that such a liner have a long life expectancy and not degrade so that the water table may be separated from the landfill for as long as possible. Once the liner and a required minimum soil cover has been deposited over the base of the landfill, waste materials can then be accepted onto the landfill for disposal.

Landfill covers are required by regulatory agencies for landfill sections that are to be left inactive for extended periods of time or at the end of every workday. Regulatory agencies require exposed waste to be covered in order to reduce the effects of fires, odor, vermin, litter, and disease on nearby populations. It is understood that the open face of a landfill is the surface of compacted trash and garbage, much enclosed in plastic bags, and other waste, but can also contain tree pieces, cans, small appliances, wood, shingles, building materials of all kinds, dirt, sludge, or any other material permitted in a landfill. Traditionally, soil was used as the primary means of cover and was applied upon deposited waste in amounts governed by how long the section of the landfill as to remain inactive.

Many current regulations require daily coverage of exposed waste with the daily cover including a minimum of six (eight in some locations) inches of soil applied to the landfill workface. Due to the non-homogeneous layout of most landfills, such a layer of soil may actually reach from 12 to 15 inches in height in certain areas in order to ensure that the six inch minimum exists throughout. Careful planning and management must be applied to each landfill installation to ensure that the utility of the available airspace is maximized. For this reason, landfills are preferably filled in sections, rather than all at once. The accepted process for waste material disposal is to section off a portion of the landfill for the day's fill and to deposit material there, compact throughout the day, and then cover the section at day's end.

To maximize the effective use of landfill space, the waste is compacted. Compaction is usually performed in two stages, prior to and after waste deposit. Compaction prior to delivery at the landfill is usually performed either by the trash collection trucks or at separate compaction or bailing facilities. Generally, household waste, as collected, is between 250–300 lb/yd$^3$ in density. Collection trucks are able to further compact this waste to 400–700 lb/yd$^3$ and bailing facilities are capable of compacting waste to levels exceeding 1000 lb/yd$^3$ in density. Once brought to the landfill facility, waste is deposited into a section of landfill and is further compacted by driving compaction equipment over and about the exposed waste.

Examples of the compaction equipment used for this purpose can range from dedicated compactors, to standard earthmovers and bulldozers. The size, weight, and range of compaction equipment generally corresponds to the size of the landfill installation, with the largest landfills having the most diverse and heaviest equipment. The compaction equipment is used to unload, deposit, and compact waste material to and within the deposit zone with its attached blade or bucket device. Once the initial placement and compaction is performed, the compaction equipment is then driven over the deposited waste material several times throughout the workday, further compacting the deposited fill waste. The fill is compacted, preferably using an area, trench or ramp method, into an open face which is typically inclined at angle of from 5° to 20°.

Studies have shown that 3 to 4 compaction cycles provide the ideal amount of compaction for any given weight of machine and that increasing the number of compaction cycles beyond 4 typically yields little gain in effective compaction. Once placed and compacted within the landfill, the same ordinary household waste that began at 250–300 lb/yd$^3$ is now stored within the landfill at 600–1500 lb/yd$^3$, with the actual amount of compaction depending on the weight and size of the equipment utilized and the number of compactions.

Because waste storage capacity is a landfill's most precious commodity, the traditional soil method of covering the waste has become less and less popular in recent years. In response to the recent demands for more efficient usage of landfill space, alternative daily cover, or ADC, systems have been suggested. The primary goal of an ADC is to perform all the functions of an eight to six inch layer of soil without the drawback of consuming large amounts of landfill capacity. Attempts have been made to cover landfills with removable tarps, but it has been shown that the deployment and retrieval processes are difficult and labor intensive. Nondegradable disposable plastic liners that are designed to be left in place have been proven to take up little landfill space but are considered potentially dangerous because of their tendency to trap methane and other gasses generated by the waste within the layers of the fill.

One ADC that has been widely accepted is the use of a degradable polyolefin film as disclosed in U.S. Pat. Nos. 5,416,133 and 5,565,503 both hereby incorporated herein by reference. The degradable film of polyolefin is desirable as an ADC because it conserves valuable fill capacity and degrades quickly enough (either through chemical, photo, stress, or biodegradation) to reduce the potential for the buildup of gasses between fill layers. An apparatus and a method for deploying degradable film is disclosed in U.S. Pat. No. 5,536,116 (the "116 patent") and U.S. Pat. No. 5,620,281 hereby incorporated herein by reference.

The apparatus disclosed in the '116 patent includes a film deployment apparatus that may be disposed on the blade of a tractor or other prime mover. The deployment apparatus is attached to the blade, usually by chains, hooks, or both. The tractor is usually powered by a diesel engine while the blade, which may be lifted and lowered, is operated by hydraulic fluid lines and a conventional electrical system. The required hydraulic and electrical power needed to operate the deployment apparatus may be obtained from the tractor by conventional hydraulic and electrical take-off lines. Alternatively, the power, fuel and hydraulic systems may be self contained on the deployment apparatus. After the deployment apparatus is attached to the blade, it may be lifted off the ground by actuating a hydraulic cylinder. When not used to support the deployment apparatus, the blade is used to push the garbage fill into the operating area of the landfill.

The deployment apparatus operates by unrolling a panel or width of film from a roll of film rotatably mounted on the deployment apparatus as the tractor moves over the workface of the landfill. Frequently, below the roll of film is at least one roller which draws the film back and down as it is unrolled from the film roll. The roller draws the film as close to the workface of the landfill as quickly as possible, thus allowing the film to unroll over the exposed workface of the landfill and seal off deposited waste from the elements and scavenging animals. Once a layer is deposited, the film is cut, either by hand or automated device, and the tractor is returned to the top of the workface to lay another layer of film adjacent to the first layer with several inches of overlap. This process is repeated until the entire day's fill is covered.

Because the film that is laid upon the landfill would otherwise be susceptible to being blown away, the deployment apparatus also deposits ballast on the film as it is laid. The ballast can take the form of any solid or semi-solid medium but is preferably soil. The deployment apparatus contains hoppers that are preferably large enough to hold enough ballast to complete the daily cover operation without refilling. Mechanical means direct the ballast out of the hoppers through outlets, where the ballast is deposited onto the desired locations of laid film.

Each layer of film generally is deployed by positioning the tractor at the top of the area to be covered so that the film is deployed as the tractor backs down the face of the landfill. The film is extended outward of the deployment apparatus and positioned under the guide roller. At the start of each pass of film, the ballast distribution mechanism is activated to deposit ballast upon the leading edge of film. The weight of the deposits of ballast is sufficient to hold the leading edge of the film in place while the tractor with attached deployment apparatus is backed down the workface of the landfill. At intervals selected by the operator, which are either accumulated manually or automatically, additional deposits of ballast are made to help secure the film in place atop the workface of the landfill. Additionally, when beginning a pass over the workface, the film can be temporarily attached about the roller in such a fashion that the weight of the first deposit of ballast frees the film from the roller and allows deployment without assistance.

With the film secured in place atop the workface by the ballast, the requirements for an ADC are met using a system that consumes much less landfill space than the traditional soil cover method. Traditional soil cover systems cost landfill operators a large amount of resources in terms of equipment required and effective fill capacity. A traditional soil cover system requires a large amount of soil to be located nearby and more machinery to emplace than a degradable film cover system.

The blades of traditional tractors and bulldozers are designed to apply high levels of forward thrust but are not built for carrying heavy machinery on their blades or bucket. Tractors used to support film deployment apparatus require more frequent servicing than is typically experienced. Furthermore, equipment manufacturers may refuse to offer warranty coverage on tractors not used in accordance with their designed purpose.

Prior art deployment methods and apparatus require substantial amount of operator interaction. In order to ensure that the film is properly deployed, the operator must continually monitor the height of the deployment apparatus attached to the blade of the tractor. If large objects are encountered on the surface of the landfill, the operator must adjust the height of the blade and deployment apparatus so that it does not interfere with the covering operation.

Additionally, in some landfill applications, it may be desirable to deploy more ballast on a film panel than was generally applied by conventional deployment apparatus with its limited supply of ballast. Insufficient ballast may allow odor or litter to escape the landfill or to allow scavengers or water seepage into the landfill.

The present invention overcomes deficiencies of the prior art and provide additional advantage to landfill operators.

BRIEF SUMMARY OF THE INVENTION

The present invention includes a method and apparatus for applying a chemical solution and then covering a landfill with a film. The apparatus includes a compactor rotatably mounted on a frame which can be hitched to a tractor. A film and ballast deployer is mounted on the end of the frame for deploying the film and ballast onto the film. The compactor includes a roller which compacts the waste and serves as a wheel for the frame. Hydraulics are provided to raise and lower the deployer. A sprayer assembly is attached to the frame to spray chemicals on the landfill prior to being covered. In operation, the assembly is pulled by the tractor causing the compactor to compact the waste immediately prior to the deployer laying the film on the landfill and the ballast being deposited onto the film. Additionally, the apparatus is capable causing the overlapping layers of laid film to adhere to the ballast in between forming a seal between the adjoining layers. The apparatus is further capable of deploying film while both ascending and descending an inclined workface of a landfill. The apparatus can also incorporate a quick release connection so that the deployer may be easily removed from the frame and attached to a bulldozer or primary mover with hooks, chains, or both. The landfill covering apparatus described herein also comprises a universal swivel hitch to allow simultaneous up down flexure as well as side to side rotation of the connection between the frame and tractor.

BRIEF DESCRIPTION OF THE DRAWINGS

For a detailed description of a preferred embodiment of the invention, reference will now be made to the accompanying drawings wherein:

FIG. 5 is a cross-section view of overlapping panels of film with ballast in between;

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
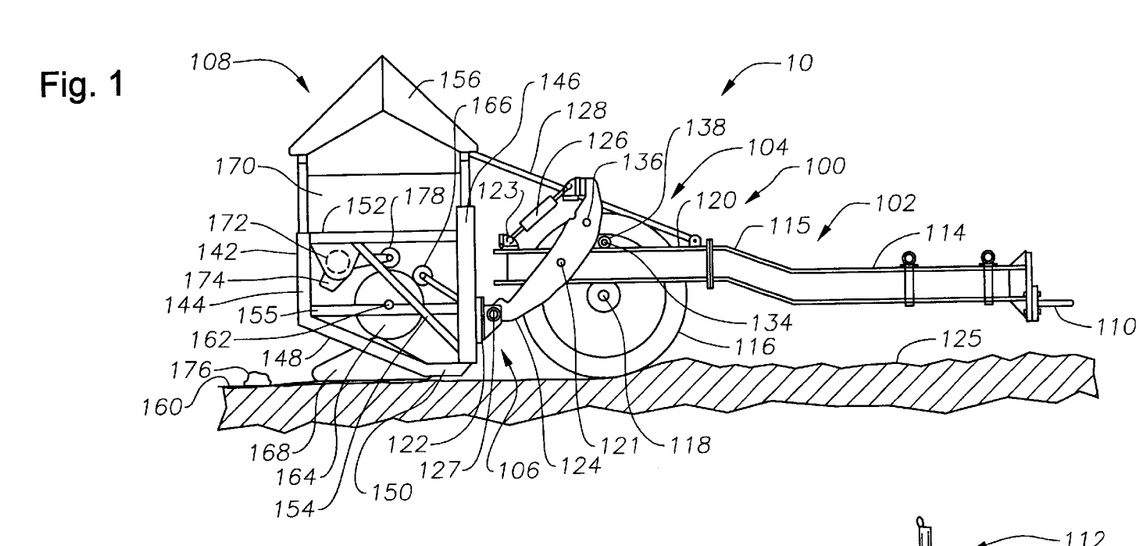
FIG. 1 is a side elevation view of an apparatus for covering a landfill including a compactor and film and ballast deployer in accordance with a preferred embodiment of the present invention.
Figure 2:
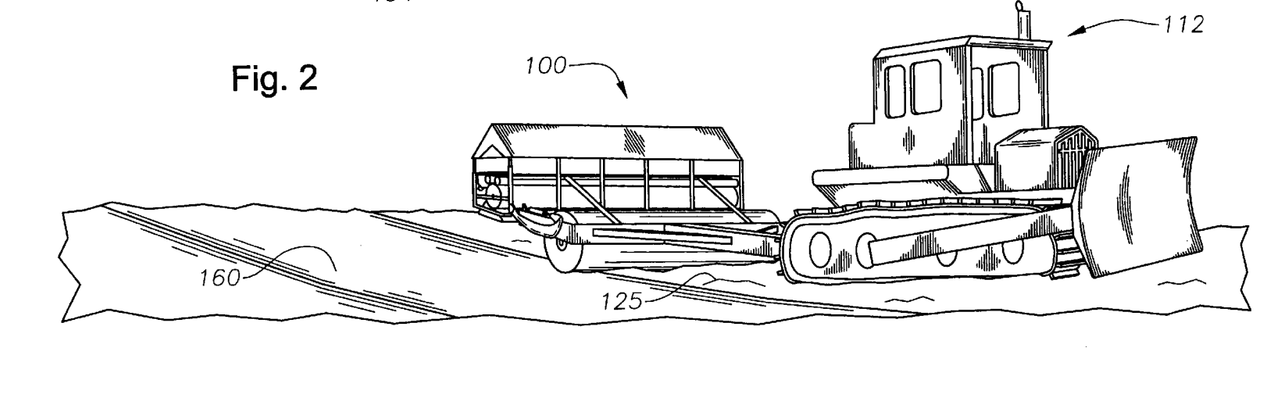
FIG. 2 is a perspective view of the apparatus of FIG. 1 being pulled by a tractor.
Figure 3:
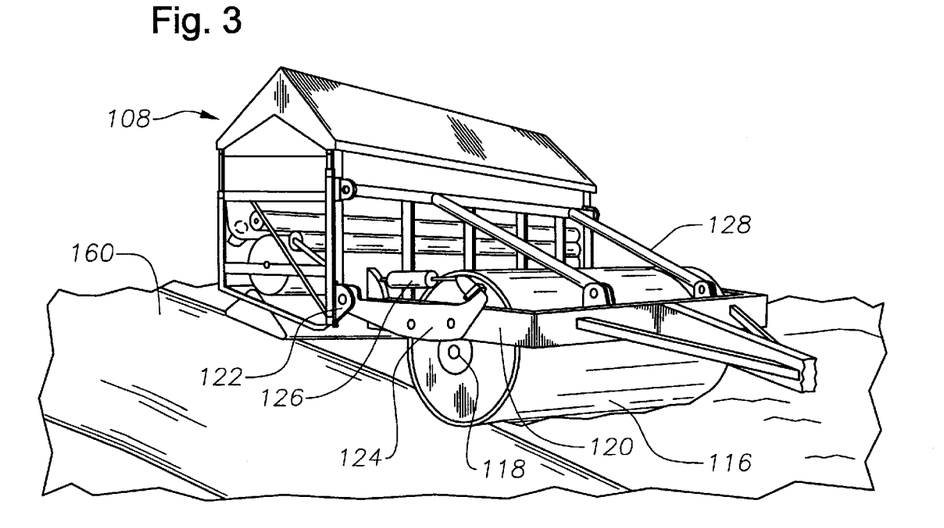
FIG. 3 is a perspective view of the apparatus shown in FIG. 1.

Referring initially to FIGS. 1–3, there is shown one preferred embodiment of the apparatus 10 of the present invention. The apparatus 10 includes a compactor 104 and a film and ballast deployer 108 mounted on a trailer frame 102 to be hitched to a prime mover, such as a towing vehicle, tractor, earthmover, or bulldozer 112. The compactor 104 is part of a deployer support unit 100 which also includes trailer frame 102 and a mounting frame 106 for mounting the film and ballast deployer 108.

Trailer frame 102 includes a tongue member 114 integral to a yoke 115 having a pair of support members 120 extending therefrom, the frame 102 being capable of carrying and sustaining any loads that are encountered during use. A universal hitch 110 is mounted at the free end of the tongue 114 for attaching the apparatus 10 to the rear of the tractor 112. The compactor 104 includes at least one large diameter roller 116 having axle members 118 for rotatably mounting the compactor 104 between the pair of outside 120 or inside (not shown) support members of trailer frame 102. Compactor 104 with roller 116 acts as a wheel for the trailer frame 102 such that as the tractor 112 pulls the apparatus 10, the compactor 104 rolls over the landfill and further compacts the waste.

Figure 6:
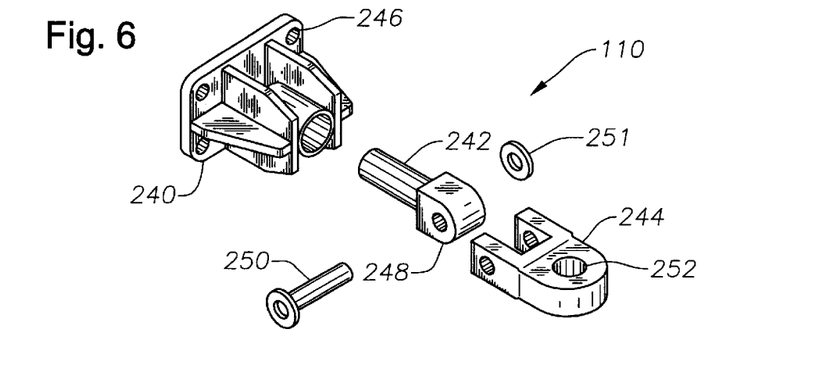
FIG. 6 is an exploded perspective view of the universal hitch.

Referring now to FIG. 6, universal hitch 110 includes a pin-shackle hitch arrangement although any commercially available hitch preferred by the operator may be used. It is preferred, that a hitch joint be used such that up-down swivel and rotation is permitted, as the terrain of a typical landfill is often uneven. Hitch 110 includes a receiver base 240, a swivel pin 242, and a pivot plate 244. Receiver base 240 includes a cylindrical bore, and is mounted to tongue member 114 by bolt holes 246. Retained within receiver base 240 is swivel pin 242 which is allowed to rotate. A pivot plate 244 is attached to a bushing head 248 of swivel pin 242 by means of a fastener 250 and a welded washer 251. Pivot plate 244 includes a hole 252 to allow hitch 110 to connect to a receiver at the rear of the tractor 112.

Referring again to FIGS. 1–3, roller 116 is preferably several feet in diameter and preferably several feet in axial length. Rollers 116 can either be hollow or solid in construction, but must be capable of supporting the large loads of the deployer 108 and trailer frame 102. It is preferred that the roller 116 be made with a smooth durable steel outer surface to ensure long life and resiliency. If roller 116 is constructed as a hollow or semi-hollow structure, it is preferred that they also include a fill port so that any cavities therein can be filled with ballast, such as water, to increase weight if desired.

Deployer 108 includes a frame 142 which includes vertical frame members 144, 146, generally horizontal frame members 148, 150, 152, 155, and brace members 154, all of which may be made from square tubing or any other suitable frame material. A hood 156 covers the top of frame 142 and includes one or more apertures for receiving ballast.

Deployer 108 is releasably mounted on mounting frame 106. Preferably, a pivot member 124 is rotatably mounted on each of the support frames 120 at 121. One end of each of the pivot members 124 is pivotly connected to a mounting flange 122 on each horizontal frame member 146 of deployer 108 by a quick release pin 127. The other end of pivot members 124 is attached to a hydraulic cylinder 126 which is mounted by a shackle at 123 to the end of mounting frame 106. Brace members 128 are rotatably connected at each end to the upper ends of vertical members 146 and the support members 120 to support the deployer 108 in a predetermined position with respect to the landfill 125. Hydraulic cylinders 126 have sufficient power to raise and lower mounting frame 106 and the attached deployer 108 relative to the position of compactor 104. Hydraulic cylinders 126 act in conjunction with pivot members 124 to provide height adjustment of deployer 108 relative to the face 125 of the landfill.

Figure 7:
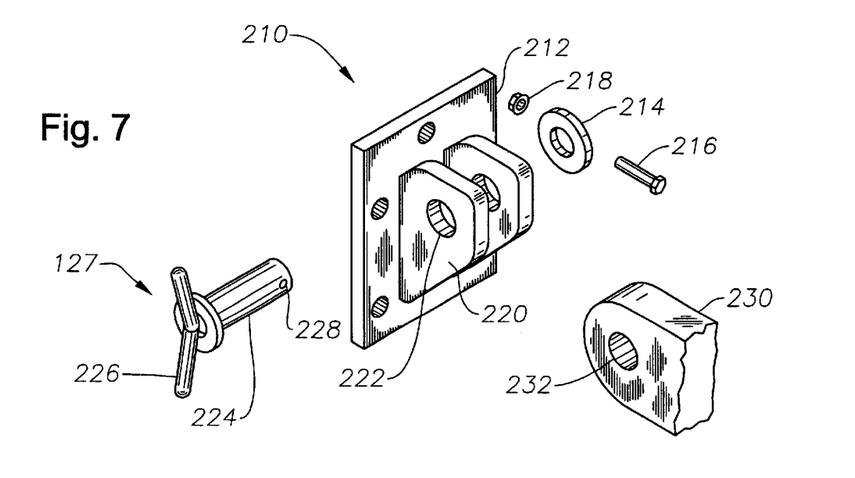
FIG. 7 is a exploded perspective view of the quick release connection.

Referring now to FIG. 7, the connection between trailer frame 102 and deployer 108 is accomplished through the use of a quick release pin 127. Quick release device 210 includes a receiver plate 212, a quick release pin 127, a washer 214, a locking bolt 216 and a locking nut 218. Receiver plate 212 includes two posts 220 with through holes 222 aligned coaxially. Pin 127 has cylindrical outer surface 224, two handle ears 226, and a lockhole 228. The device to be retained has a corresponding post 230 with through hole 232. To engage release device 210, post 230 is received between posts 220 such that holes 222 and 232 are in coaxial alignment. Pin 127 then engaged through holes 222, 232, and washer 214 concurrently. Pin 127 is then secured in place by engaging bolt 216 through lockhole 228 and retaining it with a nut 218 or safety pin.

Again, referring to FIGS. 1–3, film and ballast deployer 108 includes apparatus for deploying the film and apparatus for depositing the ballast on the film as the tractor 112 moves over the landfill 125. The apparatus for deploying the film 160 includes at least one axle or spool 162 rotatably mounted on horizontal members 155 for allowing a roll 164 of film 160 to unroll a sheet or panel of film 160 to cover the landfill 125. An idler roller 166 may be provided to maintain tension on the film 160 as it unrolls from film roll 164. Preferably, film 160 is drawn back, down and under a torsion bar 168 and in contact with the workface of the landfill during deployment. Torsion bar 168 draws the film 160 as close to the workface of the landfill 125 as quickly as possible, thus allowing film 160 to unroll over the exposed workface of landfill 125 and seal off the deposited waste from the surface.

Film 160 is preferably degradable through chemical, mechanical, thermal, photo, or biodegradation. Although deployer 108 preferably deploys a degradable film 160 material, it can be used to deploy any material for covering the landfill and may be degradable or non-degradable. The material is preferably stored in rolled form. For example, non-degradable films may be deployed for more permanent or long term cover or lining applications. Alternatively, breathable textile materials may also be deployed to landfill surfaces as effective short or long-term cover. Examples breathable textile materials for landfill cover are described in United Kingdom patent application No. GB9407807.8 entitled "Waste Disposal," hereby incorporated herein by reference. Examples of film 160 which are degradable are described in U.S. Pat. Nos. 5,416,133 and 5,565,503.

Because the film 160 (or any other material) that is laid on the landfill is susceptible to being blown away, deployer 108 includes apparatus for depositing ballast on the film 160 as the film 160 is laid. Ballast 176 can take the form of any solid or semi-solid medium but is preferably soil. One or more hoppers or drums 170 are mounted in the upper portion of frame 142 and are preferably large enough to hold enough ballast 176 to complete the daily cover operation without refilling. Augers 172 and outlet chutes 174 preferably direct the ballast 176 out of hoppers 170 and onto the desired locations of laid film 160. Motors 178 power the augers 172, and the chutes 174 can be configured to either lay ballast 176 in continuous lines, rows or separated piles, or combinations of rows/piles depending on operator preference or landfill needs. It should be appreciated that some materials, such as a breathable textile materials, may have sufficient weight so as not to require ballast to hold the materials down onto the landfill.

Deployer 108 also includes a hydraulic system and an electrical system, both operable by remote control from the cab of tractor 112 by hydraulic fluid lines and electrical lines. The required hydraulic and electrical power needed to operate deployer 108 may be obtained from tractor 112 by conventional hydraulic and electrical take-off lines or, alternatively, the power, fuel and hydraulic systems may be self contained on deployer 108.

In assembly, the deployer 108 is mounted on trailer frame 102 using quick release pins 127. The tractor 104 is hitched to the trailer frame 102 by actuating hydraulic cylinders 126 to pivot members 124 and to adjust the height of the hitch 110 to the height of the tractor hitch (not shown). Once at a common height, the trailer frame 102 is connected to the tractor 112.

The deployer 108 is then raised to its operational height by actuating hydraulic cylinders 126 to pivot members 124. As previously described, deployer 108 preferably includes its own hydraulic drive unit to energize cylinders 126 to locate deployer 108 into its preferred position. Once in position, a pin 134 is inserted through a hole 136 in pivot member 124 and into a socket 138 mounted on support frame 120 to lock the deployer 108 into its operating position on mounting frame 106. It is important to lock the deployer 108 in position in the event of a failure of hydraulic cylinders 126.

Once locked into operational position, ballast 176 is loaded into hopper 170 of deployer 108. Ballast 176 may be any material capable of being stored and deployed from deployer 108 and preferably is a material that may be stored within hopper 170 and dispensed by auger 172. Ballast 176 is most preferably a dense soil or clay mixture. Alternative mediums for ballast 176 may include, but are not limited to, sand (wet or dry), gravel, pebbles, wood chips, or asphalt.

Figure 8:
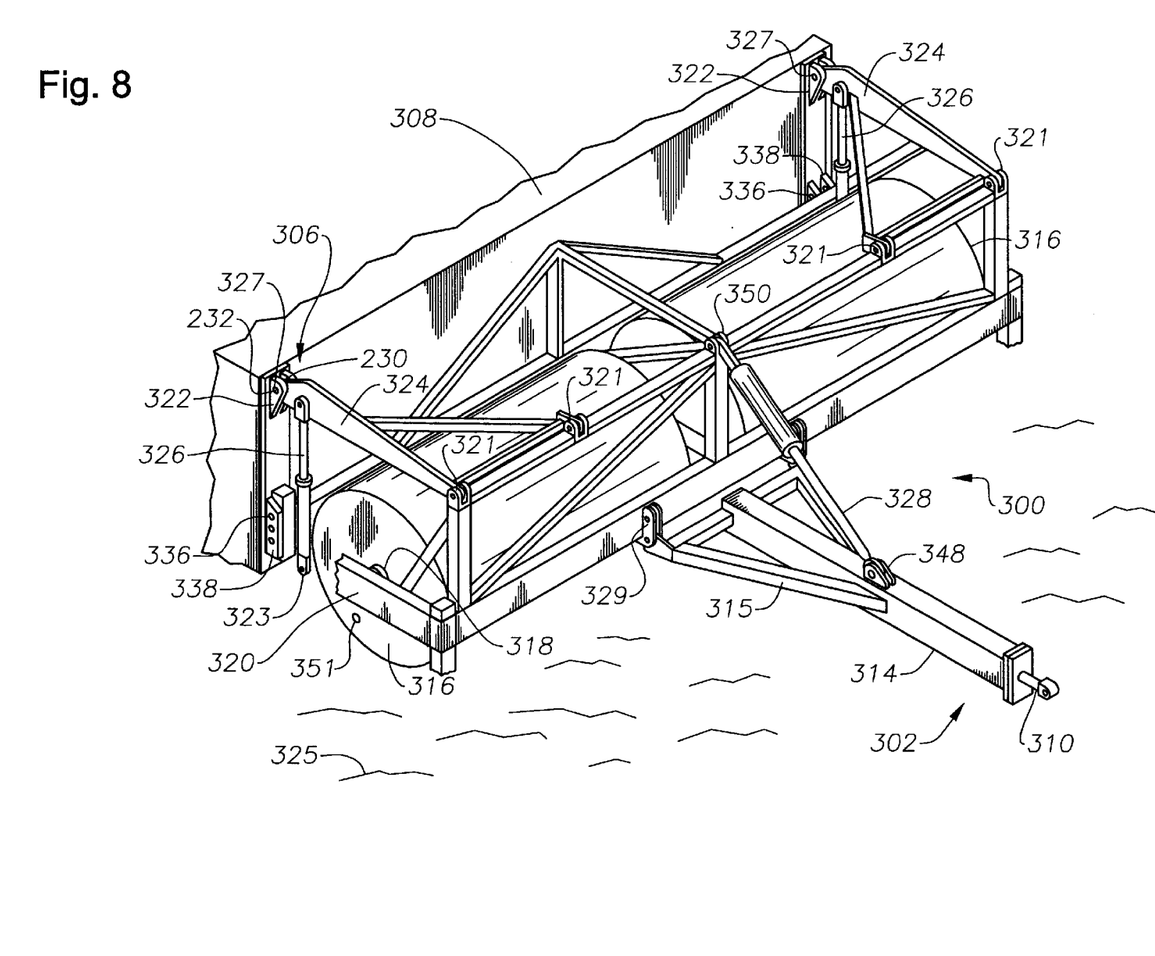
FIG. 8 is a perspective view drawing of an alternative embodiment of the apparatus of FIG. 1.
Figure 9:
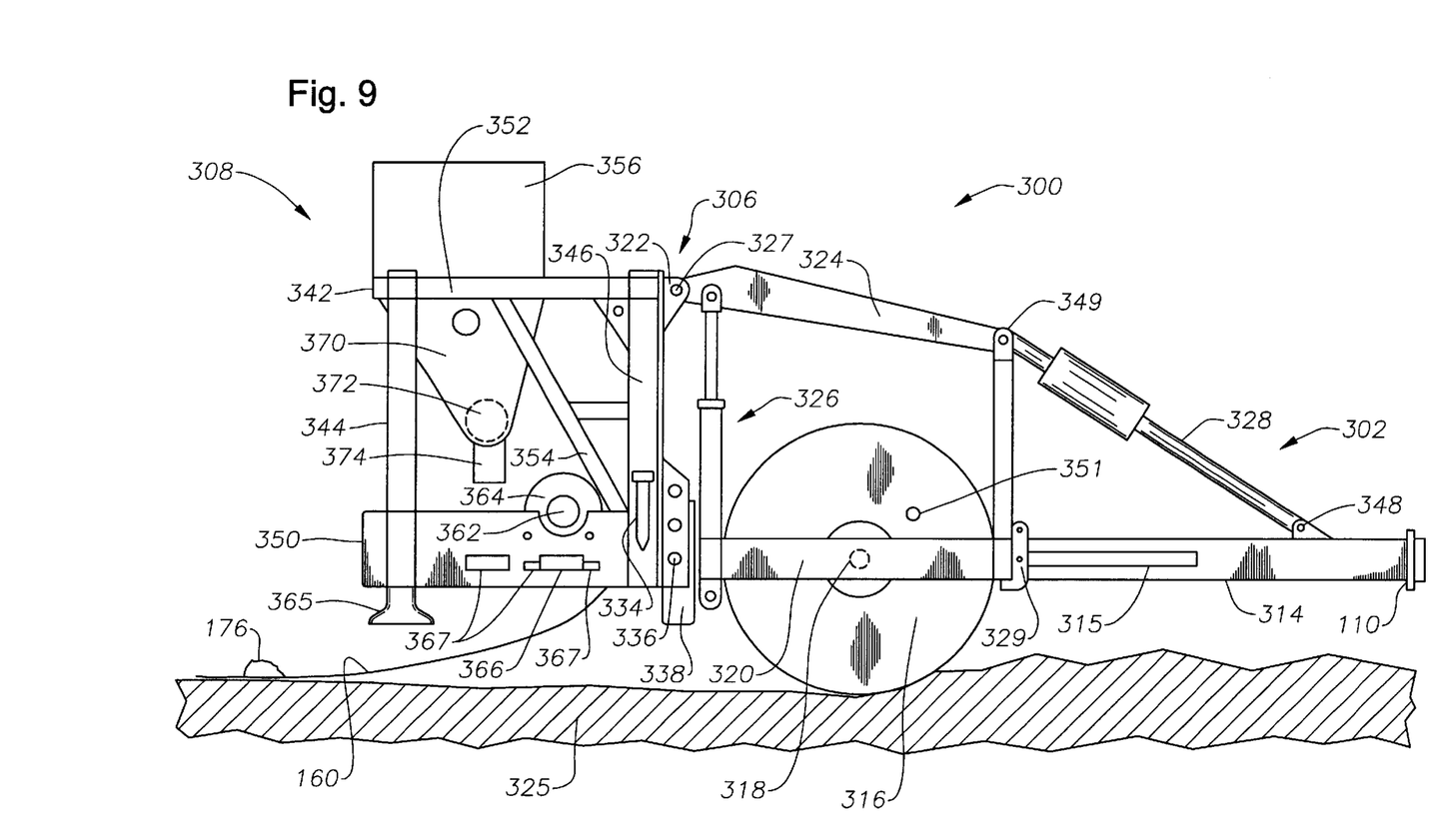
FIG. 9 is a side elevation view of the apparatus of FIG. 8.

Referring now to FIGS. 8 and 9, an alternative preferred embodiment of the present invention is shown. The apparatus 300 includes a compactor 304 and a film and ballast deployer 308 mounted on a trailer frame 302 to be hitched to a prime mover, such as tractor 112. Although deployer 308 can be different from deployer 108 of the embodiment of FIG. 1, it should be appreciated that they are interchangeable. The compactor 304 is part of a deployer support unit 300 which also includes trailer frame 302 and a mounting frame 306 for mounting the film and ballast deployer 308.

Trailer frame 302 includes a tongue member 314 integral to a yoke 315 having a pair of support members 320 extending therefrom, the frame 302 being capable of carrying and sustaining any loads that are encountered during use. A universal hitch 310, like that of hitch 110, is mounted at the free end of the tongue 314 for attaching the apparatus 300 to the rear of the tractor 12. The compactor 304 includes two large diameter rollers 316 having axle members 318 for rotatably mounting the compactor 304 between the outer and inner support members 320 of trailer frame 302. Compactor 304 with rollers 316 acts as a wheel for the trailer frame 302 such that as the tractor 312 pulls the apparatus 300, the compactor 304 rolls over the landfill and further compacts the waste.

Rollers 316 are preferably several feet in diameter and preferably several feet in axial length. Rollers 316 can either be hollow or solid in construction, but must be capable of supporting the large loads of the deployer 308 and trailer frame 302. It is preferred that the roller 316 be made with a durable steel outer surface to ensure long life and resiliency. If the rollers 316 are constructed as a hollow or semi-hollow structure, it is preferred that they also include a fill port 351 so that any cavities therein can be filled with ballast, such as water, to increase weight if desired.

Referring to FIG. 9, deployer 308 includes a frame 342 which includes vertical frame members 344, 346, generally horizontal frame members 350, 352, and brace members 354, all of which may be made from square tubing or any other suitable frame material. Horizontal support legs 350 are tapered to aid renewal and/or replacement of film 364 and also have cut out areas 367 to prevent material/contaminant build up around thrust bearings 366. Vertical frame members 344, 346 each have a round foot pad 365 to provide displacement of the weight of deployer 308, which helps reduce sinkage.

A hood 356 covers the top of frame 342 and includes one or more apertures for receiving ballast. Preferably, soil screens (not shown) cover the apertures and filter the ballast entering the apertures to an optimum size, helping prevent augers 372 (described below) from jamming. The optimum size of the openings in the screens is less than 2 inches. Further, the soil screens are positioned at an incline relative to horizontal frame members 352. The optimum incline angle that allows maximum "run off" of large oversize particles (leaving the mesh of the screens clear), but allowing the correct size particles (2 inch and under) into deployer 308 during filling, is approximately 45 degrees.

Still referring to FIG. 9, thrust bearings 366 are situated sideways on horizontal support leg 350 and below axle or spool 362. Thrust bearings 366 prevent friction and jamming of end section 363 against support leg 350. This is particularly advantageous when deployer 308 is angled or roll 364 is being deployed on an angular slope, when the likelihood of jamming between end section 363 and support leg 350 increases.

Deployer 308 is releasably mounted on mounting frame 306. Preferably, a pivot member 324 is rotatably mounted on each of the support frames 320 at 321. One end of each of the pivot members 324 is pivotly connected to a mounting flange 322 on each vertical frame member 346 of deployer 308 by a pin 327. The other end of pivot members 324 is attached to a hydraulic cylinder 326 which is mounted at 323 to the end of mounting frame 306. Another hydraulic cylinder 328 is connected at 348 and 349 to support the deployer 308 in a predetermined position with respect to the landfill 325. Hydraulic cylinder 328 has sufficient power to tilt mounting frame 306 and the attached deployer 308 relative to the position of compactor 304 at pivot points 329. Hydraulic cylinders 326 act in conjunction with pivot members 324 to provide height adjustment of deployer 308 relative to the face 325 of the landfill.

Film and ballast deployer 308 includes apparatus for deploying the film and apparatus for depositing the ballast on the film as the tractor 312 moves over the landfill 325. The apparatus for deploying the film 160 includes at least one axle or spool 362 rotatably mounted on horizontal members for allowing a roll 364 of film 160 to unroll a sheet or panel of film 160 to cover the landfill 325. Each axial end of spool 362 is covered by a hat-shaped end plate 363, having a diameter at least as large as the diameter of roll 364 to prevent damage to the end of roll 364. One of the end plates 363 is preferably welded or otherwise fixedly coupled to an axial end of spool 362.

Some landfills are located in regions having a moisture content. In such regions, the cardboard cores of roll 364 tend to expand inward, thereby reducing the diameter or opening of the cores. Accordingly, insertion of spool 362 during roll renewal became increasingly difficult. To overcome this problem, one end of spool 362 has a coned end. When the cardboard core of roll 364 implodes, the coned end of spool 362 is pushed through the core and opens the core up, allowing spool 362 to slide more easily through the core.

An idler roller (not shown) may be provided to maintain tension on the film 160 as it unrolls from film roll 364. Preferably, film 160 is drawn back, down and under a torsion bar (not shown) pivotly attached to horizontal support members and in contact with the workface of the landfill 325 during deployment. The torsion bar draws the film 160 as close to the workface of the landfill 325 as quickly as possible, thus allowing film 160 to unroll over the exposed workface of landfill 325 and seal off the deposited waste from the surface.

Because the film 160 that is laid on the landfill is susceptible to being blown away, deployer 308 includes apparatus for depositing ballast on the film 160 as the film 160 is laid. One or more hoppers 370 are mounted in the upper portion of frame 342 and are preferably large enough to hold enough ballast 176 to complete the daily cover operation without refilling. Augers 372 and outlet chutes 374 direct the ballast 176 out of hoppers 370 and onto the desired locations of laid film 160. The drive assembly for augers 372 is a splined shaft configuration. The splined shaft provides a strong drive-assembly, easy field repairs, and reduced down times. It also eliminates sprocket or attached component sheer from shafts.

Deployer 308 is raised to its operational height by actuating hydraulic cylinders 326 to pivot members 324 and preferably includes its own hydraulic drive unit to energize cylinders 326 to locate deployer 308 into its preferred position. Once in position, a pin 334 is inserted through a hole 336 in pivot member 324 and into a socket 338 mounted on support frame 320 to lock the deployer 308 into its operating position on mounting frame 306. It is important to lock the deployer 308 in position in the event of a failure of hydraulic cylinders 326.

Figure 4:
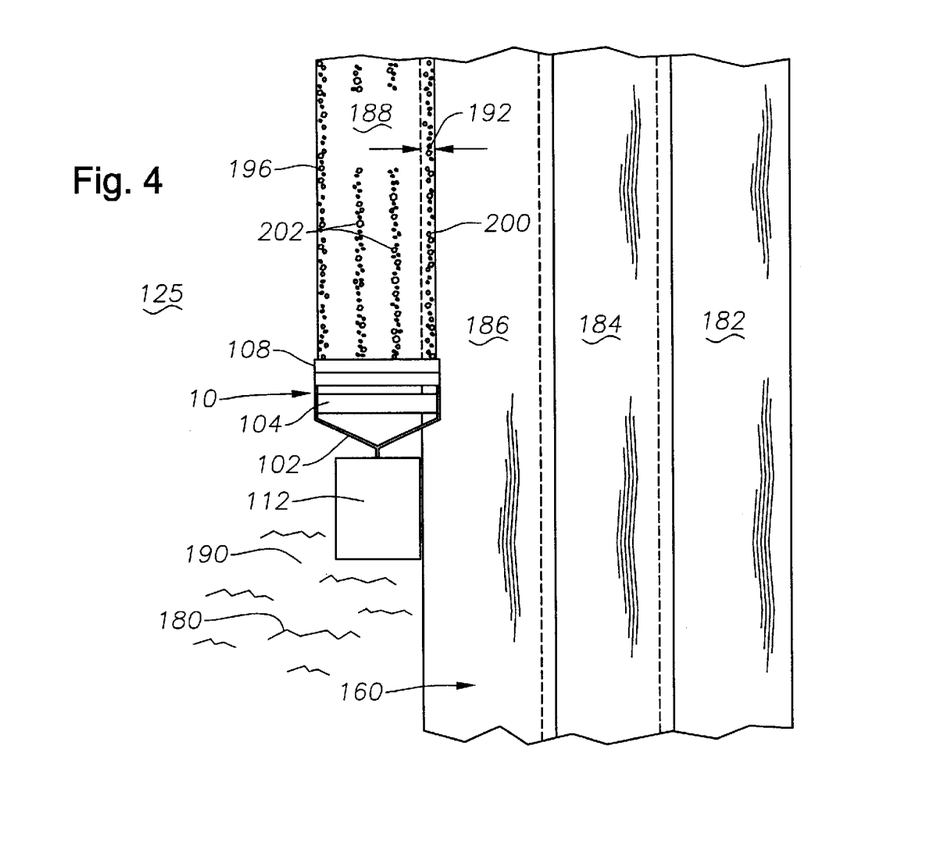
FIG. 4 is a schematic of the apparatus of FIG. 1 covering a landfill.

Referring now to FIG. 4, there is shown landfill 125 having waste 180 to be covered by film 160. Tractor 112 is shown pulling apparatus 10 (although it should be appreciated that apparatus 300 from FIGS. 8 and 9 may be used in place of apparatus 10 behind it with apparatus including compactor 104 and film and ballast deployer 108, mounted on trailer frame 102. FIG. 4 illustrates apparatus 10 laying sheets or panels 182, 184, 186, and 188 of film 160 on the workface 190 of the waste 180 in landfill 125. Panels 182–188 overlap by about 1–024 inches such as at 192 between panels 186, 188.

In operation, prior to deploying film 160 and ballast 176 on a particular workface 190, compactor 104 compresses and compacts the landfill workface 190 in advance of laying film 160 so that film 160 may be deployed on a more even top surface of workface 190 of waste 180. Avoiding an uneven surface conserves film which would otherwise have to lay over the uneven surface and require additional film. Also, further compacting the waste 180 reduces the amount of space required to accommodate the waste in the landfill. Alternatively, compactor 104 may be mounted behind deployer 108 such that compactor 104 compacts landfill and film 160 simultaneously.

As the tractor 112 pulls the apparatus 10, 300, the panels of film 160 are laid in rows over the landfill 125. Each pass of film 160 is deployed by pulling deployer 108 into position over the top of the area to be covered so that film 160 is deployed as deployer 108 is pulled over the workface 190 of the waste 180 in the landfill 125. The film 160 unrolls from roll 164, 364 as roll rotates on spool 162, 362 and then passes downward and backward under torsion bar 168 which is adjacent the workface 190. The film 160 extends outward of deployer 108, 308 and overlaps at 192 with the previously laid panel. Torsion bar 168 draws the film 160 as close to workface 190 of the landfill 125 as quickly as possible, thus allowing film 160 to unroll over the exposed workface 190 of landfill 125 and seal off deposited waste 180 from the surface.

At the start of each pass of laid film 160, augers 172 are activated to deposit ballast 176 onto the laid film 160. The chutes 174 direct the ballast 176 from the augers 172. The ballast 176 is typically laid in rows, such as 196, 202, on top of film 160. Preferably rows 196 are laid adjacent the leading edges of the panel of film 160. The weight of the deposits of ballast 176 is sufficient to hold the leading edge of film 160 in place. At intervals selected by the operator, additionally deposits of ballast 176 may be deposited to help secure film 160 in place on top of workface 190. Additionally, when beginning a pass over workface 190, film 160 can be temporarily attached to clips in such a fashion that the weight of the first deposit of ballast 176 frees film 160 from clips to allow deployment without assistance. It should be appreciated that the ballast 176 may be laid onto film 160 in a variety of fashions including by rows, batches, spreading, or like. Further it should be appreciated that rows of ballast 176 may be located in a plurality of locations on film 160. It should be appreciated that other rows 202 of ballast 176 may also be deposited on top of each panel 182–188.

Preferably, ballast 176 is dropped in pulsed batches at one or more locations equally spaced across the width of the laid film 160. The actual amounts and locations of deposited ballast material is dependant on the desires of the landfill operators and can be varied by adjusting speed and spacing settings of the deployer 108 or the speed of tractor 112. In locations where high winds prevail, it may be desirable to deposit continuous rows of ballast 176 in desired amounts whereas fills in calm areas may require much less ballast. Benefits of ballast conservation are that the hopper 170 of the deployer 108 will require fewer time consuming filling stops and that less landfill space is consumed by ballast 176.

Once a layer is deposited, the film 160 is cut, melted, or torn, either by hand or automated device, and apparatus 10 is returned to the top of workface 190 and preferably lays another layer of film 160 upon the first layer with 10–24 inches of overlap. This process is repeated until the desired area is covered.

Figure 5:
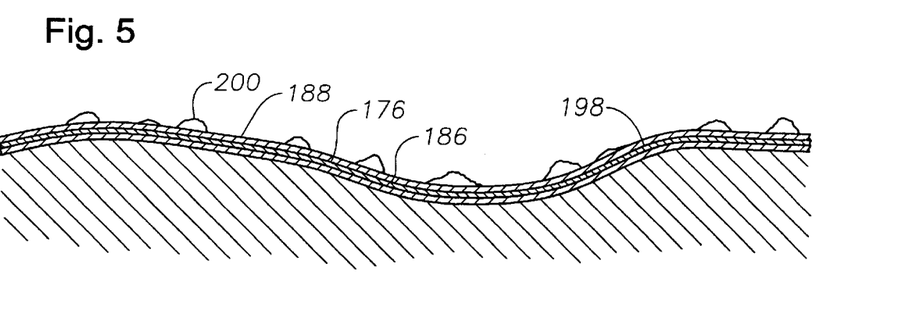

FIG. 5 is a cross-section of overlap 192 the showing previously laid panel 186 with a row, such as 196, of ballast 176 along the edge of panel 186. As the next layer 188 of film 160 is subsequently applied, compactor 104 not only compresses the landfill workface 190 but also flattens and compacts the ballast 176 previously deposited on the edge of the previously laid panel 186 of film 130 that is to be overlapped. It is preferred that panel 188 of film 160 be deployed about landfill workface 190 in an overlapping fashion such that the newly laid panel 188 being dispensed overlaps the previous laid layer 186. Ballast row 196 has been compacted on previously laid panel 186 by compactor 104 prior to newly laid panel 188 being laid by deployer 108 in overlapping relationship to previously laid panel 186 and new ballast 200 being deployed on top of the overlap 192. By flattening and compacting the ballast 176 in this manner, compactor 104 enables the deposited second layer 188 of film to attain fuller expansion than if it were being laid upon a more uneven ballast surface. Alternatively, if compactor 104 is mounted behind deployer 108 as mentioned above, compactor 104 would compact workface 190, first and second panels 186 and 188 of film 160 concurrently with first and second layers 198 and 200 of ballast 176.

Also, if ballast 176 has a high moisture content, as a clay based soil mixture would, a degree of adhesion can be achieved between the first and second layers 186, 188 of laid film 160 to form a sealing contact at 198 between panels 186, 188 and ballast 176. Alternatively, differing ballast materials can be loaded into the hoppers 170 of the deployer 108 to facilitate better adhesion. For example, gravel can be loaded into hoppers 170 that deposit ballast 170 upon the center of deployed film 160 while a moist clay ballast can be applied at the edges. This arrangement allows the adhesion between adjacent layers of film 160 as mentioned above in addition to a heavy wind and water infiltration resistant ballast at the center of each layer.

With film 160 secured in place on top of workface 190 by ballast 176, the requirements for an ADC are met using a system that consumes much less landfill space than the traditional soil cover method. Traditional soil cover systems cost landfill operators large amount of resources in terms of equipment required and effective fill capacity. A traditional soil cover system requires a large amount of soil to be located nearby and more machinery to emplace than degradable film cover system.

The weight of apparatus 10, 300 can reach upwards of 40,000 pounds depending upon the type and amount of ballast 176 carried within the hoppers 170 of deployer 108, 308 and whether roller 116, 316 is a solid member or is a hollow member filled with a liquid such as water. Because of this amount of weight, compactor 104, 304 is highly effective at compaction and allows film 160 to expand to almost its full width. In systems of the prior art where full compaction has not been achieved, the workface 190 upon which the film 160 is applied is much more uneven. Because of the unevenness, the applied film 160 contracts as it is forced into craters and crevices upon the workface 190 of the waste 180 in the landfill 125. For example, on an uneven landfill, a 16 wide film may contract within the undulations of the workface so that the effective width of coverage becomes 12 or so feet, thus losing 25–40% of the coverage potential. Because degradable film is expensive, the ability to increase effective coverage, even by only 1 or 2 feet, is highly desirable. Compactor 104, 304 enables the landfill operator to achieve effective film coverage that is much higher than was previously attainable.

Another benefit of the weight and design of the deployer assembly 100, 300 and compactor 102, 302 is that an extra effective compaction pass is achieved. As mentioned above, the density of fill waste is increased significantly from one to four compaction passes. Any number of passes over four typically yield a slightly higher density, but not enough to justify the time and expense to perform the compaction operations. With the compactor 104, 304 an operator can gain an extra compaction pass without spending any additional time or resources to achieve it. Alternatively, a landfill operator may elect to save time and resources and only compact the fill 2 or 3 times, thus allowing the compactor 104, 304 to perform the final compaction pass during the film laying operation.

Since the deployer 108 is pulled and not mounted on the blade or bucket of the tractor or bulldozer 112, smaller compaction equipment can be utilized. Before, prior art deployers would require the use of a large compactor or bulldozer capable of lifting the weight of the deployer and ballast material contained therein. Because such equipment is expensive, it is desirable for landfill operators to incorporate the deployer into their daily operations as it is designed to be pulled rather than lifted. Thus the apparatus 10 allows the landfill operating company to maintain and purchase fewer and less costly pieces of machinery.

Additionally, because of the positioning and gravity center of the apparatus 10, 300, landfill operators are able to deploy film in both directions, up and down the workface 190 in a serpentine fashion to minimize time consuming repositioning operations. Prior art systems that needed to be carried by a blade or bucket device could ordinarily be utilized only in a downwardly direction and with the tractor moving backwards. The apparatus 10, 300 enables landfill cover operations to be performed more efficiently and quickly than previously possible. If the available turnaround space is not available for a serpentine operation, the film 160 is cut and apparatus 10, 300 can back up over the landfill to its starting position so that the second, overlapping layer can be laid, thus creating further compaction and flattening of the waste.

By enabling the deployer 108, 308 to be quickly released from the trailer frame 102, 302, the landfill operator always has the option to utilize the deployer upon the blade or bucket of a prime mover. For workface areas where there is little or no room to turn around a compactor with an attached deployer, interchangeability of the deployer is highly advantageous. The quick release pin-type arrangement allows the operator to easily and quickly reconfigure the apparatus 10, 300 with as few time consuming alignment tasks as possible.

Finally, apparatus 10, 300 provides for safety enhancements to the landfill workers that operate it. Because of the wide stance and compression characteristics of the heavy rollers 116, 316, tractor 112 stability is greatly enhanced. Systems of the prior art required that deployer 108 be awkwardly carried by a piece of equipment that was not designed to carry heavy loads. Because apparatus 10 is towed, tractor 112 is not placed in a state of increased potential energy and is less prone to accidents that may cause injury to the driver.

Figure 10:
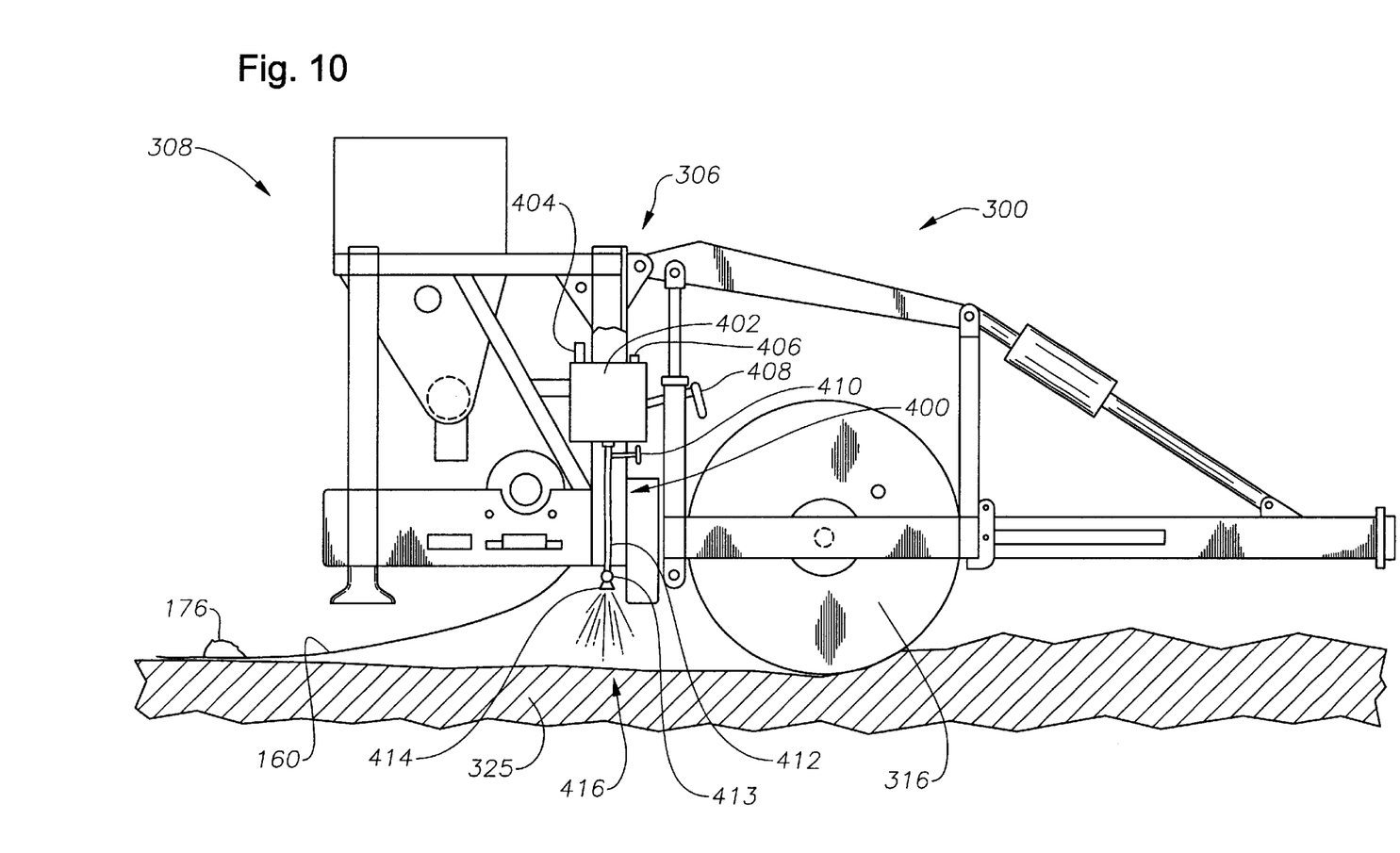
FIG. 10 is a side elevation of an improved apparatus of FIG. 9.
Figure 11:
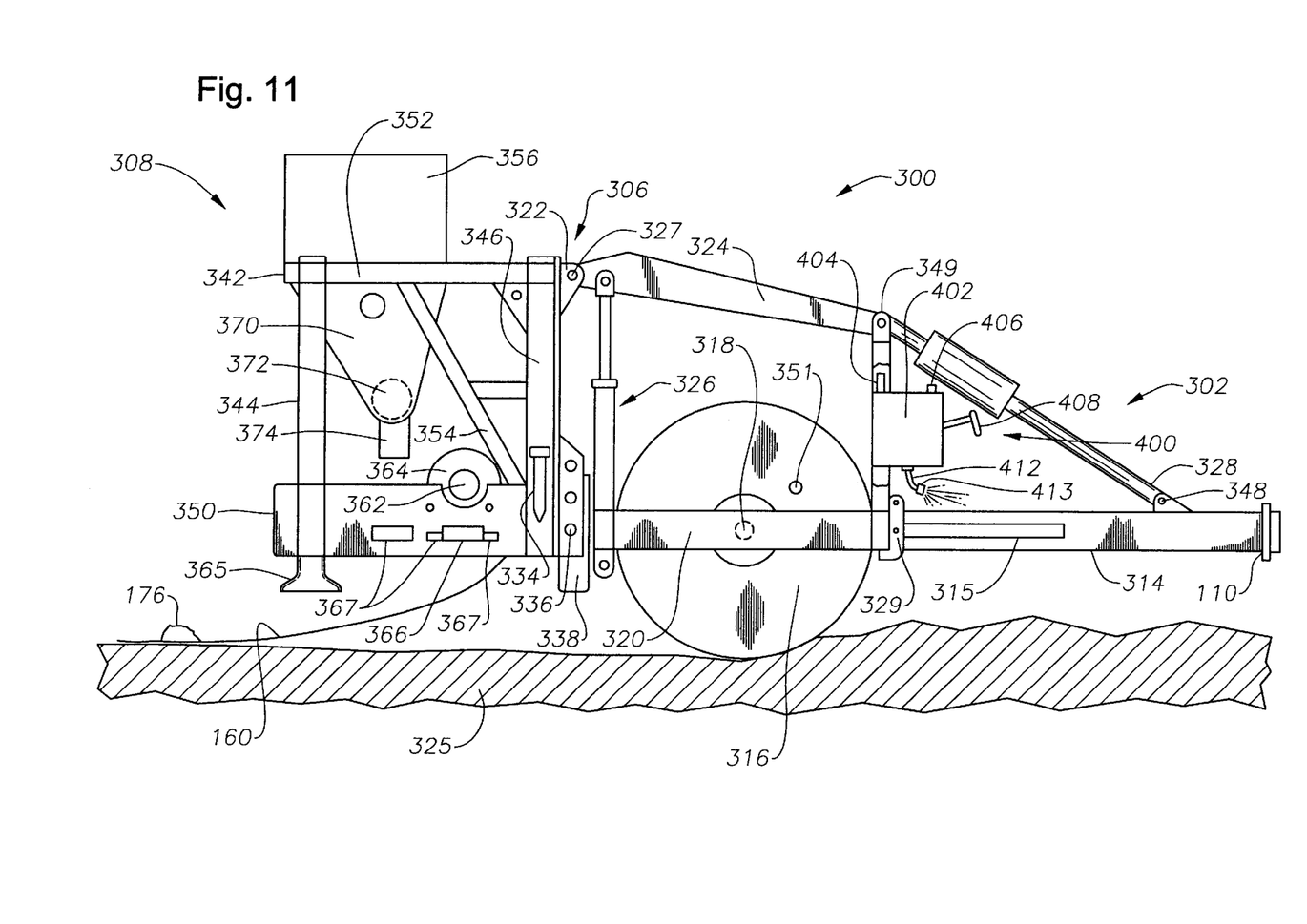
FIG. 11 is a side elevation of an improved apparatus of FIG. 9.

Referring now to FIG. 10, a sprayer apparatus 400 to apply a fluid (liquid or gaseous) is shown as part of deployer assembly 300. Sprayer apparatus 400 includes a pressure tank 402 and a pressure cap 404. Attached to pressure tank 402 is a pressure relief valve 406 and a charging pump 408. A shut off valve 410 is connected to the bottom of tank 402 and controls the flow of liquid solution from the tank 402 to a hose 412. Attached at the end of hose 412 is a spray manifold or bar 413 with at least one spray head 414 to create a spray pattern 416 when liquid flows therethrough under pressure. Spray bar 413 preferably extends across the width of the deployer 308 with distributed spray head 414 placement to more effectively cover the workface. It should be appreciated an single spray head with a wide path of coverage may communicate directly with hose 412, thus eliminating the need for a manifold device.

To operate sprayer apparatus 400, pressure cap 404 is unscrewed and the liquid to be sprayed is poured into tank 402. With the liquid in tank 402, pressure cap 404 is replaced and charging pump 408 is activated until the pressure within tank 402 reaches a predetermined level. Charging pump 408 may be of a manual or powered type and may or may not include a pressure indication device (not shown) to indicate when the pressure contained within tank 402 is sufficient. With sufficient pressure in tank 402, shut off valve 410 may be manipulated to allow the pressurized liquid to flow through hose 412 and head 414 to spray liquid 416 upon the surface of landfill 325.

Sprayer 400 is preferably located in a position that applies fluid to landfill 325 following compaction by roller 316, but before the deployment of film 160 and ballast 176. It is preferred that sprayer 400 contain and apply a pesticide solution to the topside of a compacted landfill 325 in order to control the spread of flies, mosquitoes, or any other annoying insect pest, but is understood that any beneficial chemical may be applied using sprayer 400. An example of another beneficial chemical for use in sprayer 400 is a degradation inhibitor or accelerator. Such chemicals allow the manipulation of the expected life of the degradable cover 160.

FIG. 10 shows sprayer 400 attached to the leading end of film deployer 308 but the device may be attached anywhere to the deployer assembly 300 as long as it is positioned to spray the workface before it is covered with film 160. It is preferable, although not necessary, that sprayer 400 be positioned to spray following compaction in order to maximize effectiveness and minimize the amount of chemical needed.

Numerous variations and modifications will become apparent to those skilled in the art once the above disclosure is fully appreciated. It is intended that the following claims be interpreted to embrace all such variations and modifications.

What is claimed is:

1. An apparatus for covering landfill comprising:
   a compactor to pack the landfill;
   a sprayer to apply a solution to the landfill;
   a film deployer disposed adjacent said compactor and sprayer to deploy film on the landfill; and
   a ballast deployer disposed adjacent said film deployer to deploy ballast on the film.

2. The apparatus of claim 1 wherein said solution includes a pesticide.

3. The apparatus of claim 1 wherein said solution includes a degradation accelerator.

4. The apparatus of claim 1 wherein said solution includes a degradation inhibitor.

5. The apparatus of claim 1 wherein said compactor has a smooth outer surface.

6. An apparatus to be towed by a vehicle to deploy a covering on a surface comprising:
   a frame adapted to be connected to the vehicle;
   at least one compaction roller disposed on said frame to facilitate travel over the surface; and
   at least one spray device to apply a solution to said surface following compaction;
   a deployment assembly mounted to said frame to dispense the covering onto the surface.

7. The apparatus of claim 6 wherein said compaction roller compacts material on a previously laid covering to adhere the previously laid covering to a new covering.

8. The apparatus of claim 6 wherein said solution includes a pesticide.

9. The apparatus of claim 6 wherein said compaction roller has a smooth outer surface.

10. An apparatus to apply a film on an exposed workface of a landfill comprising:
    a towing vehicle;
    a structural frame with a hitch to connect to said vehicle;
    at least one cylindrical roller disposed within said structural frame to function both as a wheel and as a compactor;
    a sprayer to apply a solution to the landfill workface;
    a deployment machine to dispense the film onto the workface and to deposit ballast upon the dispensed film; and
    a hydraulically actuated member on said frame to adjust the position of said deployment machine relative to the surface.

11. The apparatus of claim 10 wherein said cylindrical roller has a substantially smooth outer surface.

12. A method for covering a surface of a landfill comprising:
    compacting the landfill;
    spraying a solution upon the compacted landfill;
    deploying a covering onto the landfill; and
    deploying a material onto the covering.

13. The method of claim 12 further including
    compacting the material deployed onto a previously laid covering; and
    overlapping a new covering onto the compacted material and previously laid covering.

14. The method of claim 12 wherein the solution is a pesticide.

15. The method of claim 12 wherein the first step comprises attaching a prime mover to a computer.

16. The method of claim 12 further comprising:
overlapping new covering onto the compacted material and previously laid covering;
deploying additional material onto the new covering; and
compacting the material, the previously laid covering, the new covering, and the additional material.

17. A method for covering a surface of a landfill comprising:
pulling a compaction roller over the surface of said landfill to compress and flatten the surface;
spraying a solution upon the surface;
mounting a film deployment assembly behind the compaction roller;
depositing a first layer of film on top of the surface from said film deployment assembly;
depositing a ballast material on top of the first layer of film;
overlapping a second layer of film with said film deployment assembly on top of a portion of said first layer of film;
the compaction roller compacting the ballast deposited on top of the portion of said first layer of film prior to the second layer being deposited thereupon.

18. The method of claim 17 wherein differing ballast materials are deposited across the width of each of said first and said second layers of the film.

19. The method of claim 17 wherein the compaction roller has a substantially smooth outer surface.

20. A method for covering a surface of a landfill comprising:
spraying a solution on the surface;
depositing a first layer of film on top of the surface with a film deployment assembly;
depositing a first amount of ballast material on top of the first layer of film;
pulling a compaction roller over said film and said first amount of ballast material to compress and flatten the surface, the film, and the first amount of ballast;
overlapping a second layer of film with said film deployment assembly on top of a portion of said first layer of film;
depositing a second amount of ballast material on top of the second layer of film; and
the compaction roller compacting said first and second amounts of ballast material and said first and second layers of film upon said surface concurrently.

21. An apparatus for covering landfill comprising:
a compactor to compact the landfill;
a film deployer located aft of said compactor to deploy a film on the compacted landfill;
a ballast deployer disposed adjacent said film deployer to deploy ballast on said film; and
a sprayer to apply a solution to the landfill, said sprayer located between said compactor and said film deployer.

22. An apparatus for covering landfill comprising:
a compactor to compact the landfill;
a film deployer located aft of said compactor to deploy a film on the compacted landfill;
a ballast deployer disposed adjacent said film deployer to deploy ballast on said film; and
a sprayer to apply a solution to the landfill, said sprayer located forward of said compactor.

23. An apparatus for covering landfill comprising:
a compactor to pack the landfill;
a film deployer disposed adjacent said compactor to deploy film on the landfill; and
a ballast deployer disposed adjacent said film deployer to deploy ballast on the film; and
said compactor is disposed on a frame adapted for attachment to a prime mover and said film and ballast deployers being disposed on said frame.

24. The apparatus of claim 23 wherein said compactor includes a roller rotatably mounted on said frame such that said film and ballast deployers are positioned aft of said roller.

25. The apparatus of claim 24 wherein said roller serves as a wheel on said frame.

26. The apparatus of claim 24 wherein said roller includes a smooth outer surface that acts as a wheel on said frame.

27. The apparatus of claim 23 further including an actuator to raise and lower said deployers with respect to the landfill.

28. An apparatus to be towed by a vehicle to deploy a rolled covering on a surface comprising:
a frame adapted to be connected to the vehicle;
at least one compaction roller disposed on said frame to facilitate travel over the surface; and
a deployment assembly mounted to said frame aft of said compaction roller to dispense the covering onto the surface, said frame including a mount for the rolled covering adapted to allow the covering to unroll onto the surface.

29. The apparatus of claim 28 wherein said deployment assembly deposits material onto the covering.

30. The apparatus of claim 29 wherein said material is selected from the group consisting of soil, clay, gravel, sand, pebbles, asphalt, rocks, and wood chips.

31. The apparatus of claim 29 wherein said compaction roller compacts material on a previously laid covering to adhere the previously laid covering to a new covering.

32. The apparatus of claim 28 wherein said deployment assembly is mounted on said frame by a quick release connection.

33. The apparatus of claim 32 wherein said quick release connection includes a mounting bracket having apertures for receiving a removable pin.

34. The apparatus of claim 32 wherein said connection is a shear pin.

35. The apparatus of claim 28 further including a member pivotally attached to said frame and connected to said deployment assembly and frame to adjust the position of said deployment assembly relative to the surface and at least one hydraulic cylinder to pivot said member.

36. An apparatus to apply a film cover on an exposed workface of a landfill comprising:
a towing vehicle;
a structural frame with a hitch to connect to said vehicle;
at least one cylindrical roller disposed within said structural frame to function both as a wheel and as a compactor;
a deployment machine to dispense the film onto the workface and to deposit ballast upon the dispensed film, the deployment machine located aft of the cylindrical roller; and
a hydraulically actuated member on said frame to adjust the position of said deployment machine relative to the surface.

37. A method for covering a surface of a landfill comprising:
   deploying a prime mover across the surface, the prime mover adapted for pulling a compactor;
   compacting the landfill with the compactor;
   deploying a covering onto the landfill; and
   deploying a material onto the covering.

38. The method of claim 37 further including
   compacting the material deployed onto a previously laid covering; and
   overlapping a new covering onto the compacted material and previously laid covering.

39. The method of claim 37 further including mounting the compactor and a film and ballast deployer on a frame to compact the landfill and to deploy the film and the material, the compactor and film and ballast deployer mounted aft of the compactor.

40. The method of claim 39 further including pulling the frame with the prime mover.

41. The method of claim 40 further including passing over the landfill in a serpentine manner.

42. A method for covering a surface of a landfill comprising:
   pulling a compaction roller over the surface of said landfill to compress and flatten the surface;
   mounting a film deployment assembly behind the compaction roller;
   depositing a first layer of film on top of the surface from said film deployment assembly;
   depositing a ballast material on top of the first layer of film;
   overlapping a second layer of film with said film deployment assembly on top of a portion of said first layer of film;
   the compaction roller compacting the ballast deposited on top of the portion of said first layer of film prior to the second layer being deposited thereupon.

43. The method of claim 42 wherein differing ballast materials are deposited across the width of each of said first and said second layers of the film.

44. A method for covering a surface of a landfill comprising:
   depositing a first layer of film on top of the surface with a film deployment assembly;
   depositing a first amount of ballast material on top of the first layer of film;
   pulling a compaction roller over said film and said first amount of ballast material to compress and flatten the surface, the film, and the first amount of ballast;
   overlapping a second layer of film with said film deployment assembly on top of a portion of said first layer of film;
   depositing a second amount of ballast material on top of the second layer of film; and
   the compaction roller compacting said first and second amounts of ballast material and said first and second layers of film upon said surface concurrently.

45. The method of claim 44 wherein differing ballast materials are deposited across the width of each of said first and said second layers of the film.

46. The method of claim 45 wherein the first ballast material is soil.

47. The method of claim 46 wherein the second ballast material is gravel.

48. The method of claim 46 wherein the second ballast material is sand.

49. The method of claim 45 wherein the first ballast material is a clay based composition.

50. The method of claim 49 wherein the second ballast material is gravel.

51. The method of claim 49 wherein the second ballast material is sand.

52. An apparatus to be towed by a vehicle to deploy a covering on a surface comprising:
   a frame adapted to be connected to the vehicle;
   at least one smooth compaction roller disposed on said frame to facilitate travel over the surface; and
   a deployment assembly mounted to said frame aft of said compaction roller to dispense a rolled covering onto the surface, said frame including a mount for the rolled covering adapted to allow the covering to unroll onto the surface.

53. The apparatus of claim 52 wherein the rolled covering is a plastic film.

54. The apparatus of claim 52 wherein the rolled covering is a textile fabric.

55. The apparatus of claim 52 wherein the rolled covering is a elastomeric sheet.

* * * * *